US009300341B2

(12) United States Patent
Lu

(10) Patent No.: US 9,300,341 B2
(45) Date of Patent: Mar. 29, 2016

(54) SUBSCRIBER IDENTITY MODULE CARD COMPATIBLE APPARATUS AND TERMINAL DEVICE

(71) Applicant: ZTE CORPORATION, Shenzhen, Guangdong Province (CN)

(72) Inventor: Jing Lu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/402,723

(22) PCT Filed: May 15, 2013

(86) PCT No.: PCT/CN2013/075666
§ 371 (c)(1),
(2) Date: Nov. 21, 2014

(87) PCT Pub. No.: WO2013/174224
PCT Pub. Date: Nov. 28, 2013

(65) Prior Publication Data
US 2015/0148101 A1 May 28, 2015

(30) Foreign Application Priority Data
May 21, 2012 (CN) .......................... 2012 1 0159898

(51) Int. Cl.
H04B 1/3818 (2015.01)
G06K 7/00 (2006.01)
H04M 1/02 (2006.01)

(52) U.S. Cl.
CPC ............ H04B 1/3818 (2015.01); G06K 7/0013 (2013.01); G06K 7/0052 (2013.01); H04M 1/026 (2013.01)

(58) Field of Classification Search
CPC .................................................... H04B 1/3818
See application file for complete search history.

(56) References Cited

U.S. PATENT DOCUMENTS

| 5,933,328 | A | 8/1999 | Wallace et al. |
| 6,241,545 | B1 | 6/2001 | Bricaud et al. |
| 6,612,498 | B1 * | 9/2003 | Lipponen et al. ............. 235/486 |
| 2001/0019077 | A1 * | 9/2001 | Buschmann ................... 235/439 |
| 2002/0168900 | A1 | 11/2002 | Chen |
| 2005/0048833 | A1 | 3/2005 | Kimura et al. |
| 2012/0108294 | A1 * | 5/2012 | Kaul ............................. 455/558 |

FOREIGN PATENT DOCUMENTS

| CN | 2710205 Y | 7/2005 |
| CN | 2840351 Y | 11/2006 |
| CN | 201829777 U | 11/2011 |
| CN | 202142703 U | 2/2012 |
| JP | 2006164749 A | 6/2006 |

* cited by examiner

Primary Examiner — Tammy Pham
Assistant Examiner — Idowu O Osifade
(74) Attorney, Agent, or Firm — Ling Wu; Stephen Yang; Ling and Yang Intellectual Property

(57) ABSTRACT

A subscriber identity module card compatible apparatus and a terminal device, including: a base; a first card slot for a first SIM card to be inserted into, a second card slot for a second SIM card to be inserted into, and a stopper used for preventing the second SIM card from being inserted into the second card slot after the first SIM card is inserted into the first card slot or preventing the first SIM card from being inserted into the first card slot after the second SIM card is inserted into the second card slot; all of the first card slot, the second card slot and the stopper are arranged on the base, and the stopper is arranged between the first card slot and the second card slot.

6 Claims, 1 Drawing Sheet

SUBSCRIBER IDENTITY MODULE CARD COMPATIBLE APPARATUS AND TERMINAL DEVICE

TECHNICAL FIELD

The present document relates to the field of mobile communication technologies, and more particularly, to a subscriber identity module card compatible apparatus and a terminal device.

BACKGROUND

With the development of mobile communication technologies, Apple Inc introduced the Micro SIM (Micro Subscriber Identity Module) card on its end products, and currently more and more manufacturers are following up and using the Micro SIM card.

The Micro SIM card is completely incompatible with the size of the currently most commonly used SIM (subscriber identity module) cards. There are a lot of inconveniences when the user encounters a situation in which the card in use needs to be changed.

SUMMARY

The embodiment of the present document provides a subscriber identity module card compatible apparatus and a terminal device, to realize the interchangeable of the Micro SIM cards and the ordinary SIM cards.

A subscriber identity module card compatible apparatus in accordance with an embodiment of the present document, comprising: a base, a first card slot for a first subscriber identity module (SIM) card to be inserted into, a second card slot for a second SIM card to be inserted into, and a stopper used for preventing the second SIM card from being inserted into the second card slot after the first SIM card is inserted into the first card slot as well as preventing the first SIM card from being inserted into the first card slot after the second SIM card is inserted into the second slot, all of the first card slot, second card slot and the stopper are arranged on the base, the stopper is arranged between the first card slot and the second card slot.

Preferably, the stopper comprises a fixed shaft, a first blocking portion and a second blocking portion, the fixed shaft is fixed to the base, the first blocking portion is connected with the second blocking portion, and both of them can rotatablely connected to the fixed shaft, the first blocking portion extends into the inlet of the first card slot, and the second blocking portion extends to the inlet of the second card slot.

Preferably, the stopper comprises a shaft, a first blocking portion and a second blocking portion, the shaft is rotatablely arranged on the base, the first blocking portion and the second blocking portion are connected with each other, and both of them are fixedly connected to the shaft, the first blocking portion extends into the inlet of the first card slot, and the second blocking portion extends into the inlet of the second card slot.

Preferably, signal lines are provided on both the first card slot and the second card slot, and the same signal lines on the first card slot and the second card slot are connected with each other.

Preferably, the first card slot is a card slot for ordinary SIM card, and the second card slot is a card slot for Micro SIM card.

A terminal device in accordance with an embodiment of the present document comprising: a motherboard and a subscriber identity module card compatible apparatus, the subscriber identity module card compatible apparatus is arranged on the motherboard, and comprises a base, a first card slot for a first subscriber identity module (SIM) card to be inserted into, a second card slot for a second SIM card to be inserted into, and a stopper used for preventing the second SIM card from being inserted into the second card slot after the first SIM card is inserted into the first card slot, as well as preventing the first SIM card from being inserted into the first card slot after the second SIM card is inserted into the second card slot, all of the first card slot, the second card slot, and the stopper are arranged on the base, and the stopper is arranged between the first card slot and the second card slot.

Preferably, the stopper comprises a fixed shaft, a first blocking portion and a second blocking portion, the fixed shaft is fixed to the base, the first blocking portion and the second blocking portion are connected with each other, and both of them are rotatablely connected to the fixed shaft, the first blocking portion extends into the inlet of the first card slot and the second blocking portion extends to the inlet of the second card slot.

Preferably, the stopper comprises a shaft, a first blocking portion and a second blocking portion, the shaft is rotatablely arranged on the base, the first blocking portion and the second blocking portion are connected with each other, and both of them are fixedly connected to the shaft, the first blocking portion extends into the inlet of the first card slot, and the second blocking portion extends into the inlet of the second card slot.

Preferably, signal lines are provided on both the first card slot and the second card slot, and the same signal lines on the first card slot and the second card slot are connected with each other.

Preferably, the first card slot is a card slot for the ordinary SIM card, and the second card slot is a card slot for the Micro SIM card.

In summary, the embodiments of the present document can be simultaneously compatible with two kinds of SIM cards such as the ordinary SIM card and the Micro SIM card, thus improving the convenience of the user using the terminal, meeting the user demands, and enhancing the competitiveness of the end products, the terminal's compatible capabilities and the user experience on the one hand, and being compatible with more kinds of SIM cards on the other hand, which means it can have more users and strive for more user resources, moreover, the structure of the SIM card compatible device is simple, and the action thereof is reliable.

PREFERRED EMBODIMENTS OF THE DOCUMENT

The present embodiment provides a SIM card compatible apparatus, which is provided with two separate card slots, and a stopper is used to make sure there is only one SIM card inserted into the card slot at the same time.

The SIM card compatible apparatus in accordance with the present embodiment comprises a first card slot for a first SIM card to be inserted into, and a second card slot for a second SIM card to be inserted into, the first SIM card is an ordinary SIM card and the second SIM card is a Micro SIM card. The first card slot and the second card slot are provided on the same base as a whole. The signal lines on the two card slots are connected together, and a stopper is provided between the two card slots, and only one SIM card is allowed to be inserted into at the same time.

For ease of understanding, in conjunction with the accompanying drawings, the embodiments of the present document will be described in detail in the following.

Figure 1:
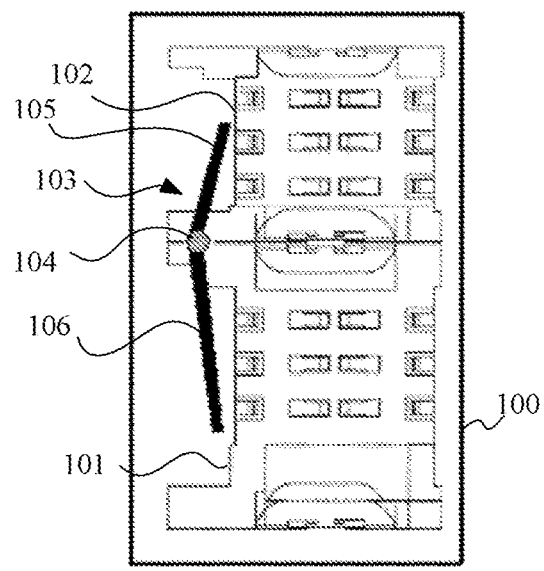
FIG. 1 is a structural diagram of a SIM card compatible apparatus in accordance with the present embodiment.

As shown in FIG. 1, the SIM card compatible apparatus in accordance with the present embodiment comprises: base 100, card slots for two kinds of different SIM cards: the first card slot 101 and the second card slot 102, which can be compatible with two kinds of SIM cards, the first card slot 101 is a card slot for the SIM card to be inserted into, and the second card slot 102 is a card slot for the Micro SIM card to be inserted into, and both of them are provided on the base 100.

Because it is compatible with the SIM card and the Micro SIM card, rather than using the two kinds of SIM cards simultaneously, the signal lines of the first card slot 101 and the second card slot 102 are connected together, if the user mistakenly inserts two SIM cards, it will result in an electrical fault. Therefore a stopper 103 used for preventing wrong insertion is arranged between the first card slot 101 and the second card slot 102, and can be against the bottom of the card after the card is inserted into the card slot, and the leverage principle is used to ensure that the user does not simultaneously insert two cards, thereby avoiding failure.

The stopper 103 comprises a fixed shaft 104, first blocking portion 105 and second blocking portion 106. The fixed shaft 104 is fixed to the base 100. The first blocking portion 105 and the second blocking portion 106 are connected with each other and rotatablely connected to the fixed the shaft 104, each of them corresponds to a card slot, the first blocking portion 105 extends to the inlet of the first card slot 101, the second blocking portion 106 extends to the inlet of the second card slot 102. When being inserted into by a card, the first card slot 101 corresponding to the first blocking portion 105 rotates around the fixed axis 104 under the impetus of the card and extends with the card into the first card slot 101, meanwhile the second blocking portion 106 rotates around the fixed axis 104 in an opposite direction of the first blocking portion 105, and extends to the position of the inlet of the corresponding second slot 102 to block the insertion of the card.

Similarly, when being inserted into by a card, the second slot 102 corresponding to the second blocking portion 106 rotates around the fixed shaft 104 under the impetus of the card and extends into the card slot with the card, meanwhile, the first blocking portion 105 rotates around the fixed shaft 104 in the opposite direction of the second blocking portion 106, and extends into the position of the inlet of the corresponding first slot 101 to block the insertion of the card. Even if the user violently inserts a card, the other card will be ejected, therefore the leverage principle is used to avoid the situation in which two cards are inserted simultaneously. When the user needs to change the card, the stopper can also help the user eject the existing card.

Moreover, the stopper 103 can also use the shaft, the first blocking portion 105 and the second blocking portion 106, the shaft is rotatablely provided on the base 100, the first blocking portion 105 and the second blocking portion 106 are connected with each other, and both of them are fixedly connected with the shaft.

Figure 2:
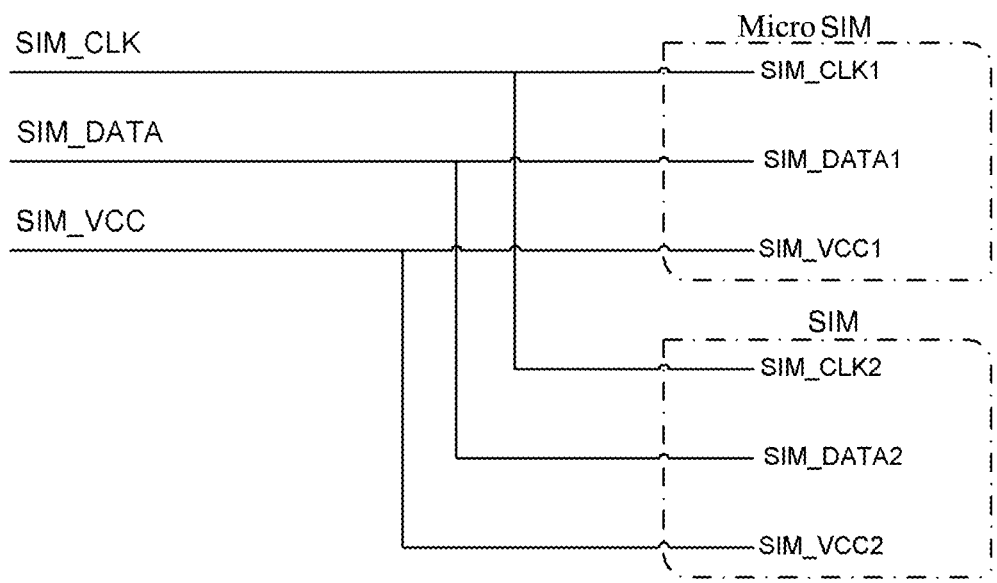
FIG. 2 is a schematic diagram of the connection of signal lines of the card slot in the SIM card compatible apparatus in accordance with the present embodiment.

As shown in FIG. 2, all the signal lines of the first card slot 101 and the second card slot 102 correspond with each other and are connected together. Inserting a card in any card slot can work normally, but not inserting two cards at the same time, otherwise, it will results in an electrical fault.

The present embodiment further provides a terminal device, comprising: a motherboard and a subscriber identity module card compatible apparatus, the subscriber identity module card compatible apparatus is arranged on the motherboard and comprises a base, a first card slot for a first SIM card to be inserted into, a second card slot for the second SIM card to be inserted into, and a stopper used for preventing the second SIM card from being inserted into the second card slot after the first SIM card is inserted into the first card slot, as well as preventing the first SIM card from being inserted into the first card slot after the second SIM card is inserted into the second slot, all of the first card slot, the second card slot, and the stopper are arranged on the base, and the stopper is arranged between the first card slot and the second card slot.

The stopper comprises a fixed shaft, a first blocking portion and a second blocking portion, the fixed shaft is fixed to the base, the first blocking portion and the second blocking portion are connected with each other, and both of them can be rotatablely connected to the fixed shaft, the first blocking portion extends to the inlet of the first card slot, and the second blocking portion extends into the inlet of the second card slot; or the stopper comprises a shaft, a first blocking portion and a second blocking portion, the shaft is rotatablely fixed to the base, the first blocking portion and the second blocking portion are connected with each other, and both of them can be fixedly connected to the shaft, the first blocking portion extends to the inlet of the first card slot, and the second blocking portion extends into the inlet of the second card slot.

Signal lines are provided on both the first card slot and the second card slot, and the same signal lines of the first card slot and the second card slot are connected correspondingly with each other. The first card slot is a card slot for SIM card, and the second card slot is a card slot for Micro-SIM card.

The present document is described in further detail with conjunction of the specific preferred embodiments in the above description, but the specific embodiments of the present document are not limited to only the above description. Those of ordinary skill in the art can make various simple deductions or replacements without departing from the concept of the present document, and these deductions and replacements should be considered as belonging to the protection scope of the present document as different implementation structures. Accordingly, the protection scope of the present document should be the protection scope of the claims.

INDUSTRIAL APPLICABILITY

The embodiments of the present document can be simultaneously compatible with two kinds of SIM cards such as the ordinary SIM card and the Micro SIM card, thus improving the convenience of the user using the terminal, meeting the user demands, and enhancing the competitiveness of the end products, the terminal's compatible capabilities and the user experience on the one hand, and being compatible with more kinds of SIM cards on the other hand, which means it can have more users and strive for more user resources, moreover, the structure of the SIM card compatible device is simple, and the action thereof is reliable.

What is claimed is:

1. A subscriber identity module card compatible apparatus, comprising:

a base, a first card slot for a first subscriber identity module (SIM) card to be inserted into, a second card slot for a second SIM card to be inserted into, and a stopper used for preventing the second SIM card from being inserted into the second card slot after the first SIM card is inserted into the first card slot as well as preventing the first SIM card from being inserted into the first card slot after the second SIM card is inserted into the second card slot;

all of the first card slot, the second card slot and the stopper are arranged on the base, and the stopper is arranged between the first card slot and the second card slot;

wherein a base-side of the first card slot and a base-side of the second card slot are placed on a plane of the base;

the stopper comprises a fixed shaft, a first blocking portion and a second blocking portion;

the fixed shaft is fixed to the base; the first blocking portion and the second blocking portion are connected with each other, and both of them are rotatablely connected to the fixed shaft; the first blocking portion extends into an inlet of the first card slot, and the second blocking portion extends to an inlet of the second card slot; wherein the fixed shaft is perpendicular to said plane of the base; or the stopper comprises a shaft, a first blocking portion and a second blocking portion; the shaft is rotatablely arranged on the base; the first blocking portion and the second blocking portion are connected with each other, and both of them are fixedly connected to the shaft; the first blocking portion extends into an inlet of the first card slot, and the second blocking portion extends into an inlet of the second card slot; wherein the shaft is perpendicular to said plane of the base.

2. The subscriber identity module card compatible apparatus of claim 1, wherein, signal lines are provided on both the first card slot and the second card slot, and same signal lines on the first card slot and the second card slot are connected with each other.

3. The subscriber identity module card compatible apparatus of claim 1, wherein, the first card slot is a card slot for an ordinary SIM card, and the second card slot is a card slot for a Micro SIM card.

4. A terminal device, comprising:

a motherboard and a subscriber identity module (SIM) card compatible apparatus, wherein, the SIM card compatible apparatus is arranged on the motherboard, and comprises a base, a first card slot for a first SIM card to be inserted into, a second card slot for a second SIM card to be inserted into, and a stopper used for preventing the second SIM card from being inserted into the second card slot after the first SIM card is inserted into the first card slot, as well as preventing the first SIM card from being inserted into the first card slot after the second SIM card is inserted into the second card slot; all of the first card slot, the second card slot, and the stopper are arranged on the base, and the stopper is arranged between the first card slot and the second card slot;

wherein a base-side of the first card slot and a base-side of the second card slot are placed on a plane of the base;

the stopper comprises a fixed shaft, a first blocking portion and a second blocking portion;

the fixed shaft is fixed to the base; the first blocking portion and the second blocking portion are connected with each other, and both of them are rotatablely connected to the fixed shaft; the first blocking portion extends into an inlet of the first card slot, and the second blocking portion extends to an inlet of the second card slot; wherein the fixed shaft is perpendicular to said plane of the base; or the stopper comprises a shaft, a first blocking portion and a second blocking portion; the shaft is rotatablely arranged on the base; the first blocking portion and the second blocking portion are connected with each other, and both of them are fixedly connected to the shaft; the first blocking portion extends into an inlet of the first card slot, and the second blocking portion extends into an inlet of the second card slot; wherein the shaft is perpendicular to said plane of the base.

5. The terminal device of claim 4, wherein, signal lines are provided on both the first card slot and the second card slot, and same signal lines on the first card slot and the second card slot are connected with each other.

6. The terminal device of claim 4, wherein, the first card slot is a card slot for an ordinary SIM card, and the second card slot is a card slot for a Micro SIM card.

* * * * *